United States Patent [19]

Perkins

[11] 4,328,945

[45] May 11, 1982

[54] BATTERY CONTAINER MOLD

[75] Inventor: William J. Perkins, Anderson, Ind.

[73] Assignee: General Motors Corporation, Detroit, Mich.

[21] Appl. No.: 272,110

[22] Filed: Jun. 10, 1981

Related U.S. Application Data

[63] Continuation of Ser. No. 172,759, Jul. 28, 1980, abandoned.

[51] Int. Cl.³ .................... B29C 1/06; B29C 7/00; B29F 1/022; B29F 1/14
[52] U.S. Cl. .................................. 249/67; 249/64; 425/438; 425/577; 425/DIG. 58
[58] Field of Search ............... 425/DIG. 5, DIG. 58, 425/468, 577; 249/64, 67, 68

[56] References Cited

U.S. PATENT DOCUMENTS

| | | | |
|---|---|---|---|
| 3,473,197 | 10/1969 | Wilds | 425/577 |
| 3,509,603 | 5/1970 | Hallsall et al. | 249/64 X |
| 3,564,660 | 2/1971 | Darnell | 425/577 X |
| 3,607,440 | 9/1971 | Daniel et al. | |
| 3,767,156 | 10/1973 | Sullivan | 425/577 X |
| 3,816,047 | 6/1974 | Mahler | 425/577 |
| 3,905,740 | 9/1975 | Lovejoy | 425/468 X |
| 3,930,780 | 1/1976 | Lovejoy | 425/577 X |
| 3,969,055 | 7/1976 | Buckethal | 425/577 X |
| 4,041,603 | 8/1977 | Thune | |

Primary Examiner—J. Howard Flint, Jr.
Attorney, Agent, or Firm—Lawrence B. Plant

[57] ABSTRACT

Mold for injection molding battery containers which include a plurality of thin resilient ribs integral with and projecting at acute angles from the inside walls thereof into the cell compartment(s) to hold the battery's innards therein. The core of the mold includes a compartment-shaping mandrel which in turn includes ejector bars reciprocally slideable within complementary-shaped mortises in the mandrel. Rib-forming cavities are formed in the side walls of the ejector bars. Lips at the distal ends of the ejector bars project toward the mortise walls to produce undercuts at the bases of the ribs which in turn result in the formation of ribs which are detached from the bottom of the container.

5 Claims, 12 Drawing Figures

BATTERY CONTAINER MOLD

This is a Continuation, of application Ser. No. 172,759, filed July 28, 1980, now abandoned.

BACKGROUND OF THE INVENTION

This invention relates to molds for injection molding battery containers, the walls of which have thin, resilient, integrally molded ribs projecting at acute angles into the cell compartment(s) defined by the walls. The ribs deflect various amounts according to the thickness of the cell elements comprising the battery's electrochemical innards and serve to firmly retain the innards in the container while cushioning them against vibration. While the invention is most particularly useful for molding multicell, lead-acid, automotive battery containers, it is also applicable to single cell and other types of batteries.

Automobile, SLI, lead-acid storage batteries have standardized outside dimensions in different size categories. The manufacturers thereof typically provide batteries with varying energy capacities in each size category. This is done by varying the number of positive and negative plates in each cell element which comprises the battery's electrochemical innards. Varying the number of plates, however, varies the thickness of the cell element to be positioned and firmly retained in the container's cell compartment(s). Lower energy batteries typically contain about nine plates per cell element while higher energy batteries can contain as high as sixteen plates per element. These elements typically vary in thickness from about 2.42 cm for the low energy batteries to about 4.24 cm for the high energy batteries depending on the number of plates and the particular manufacturer's specifications.

In order to reduce container inventory, some manufacturers have molded universal containers which can readily be modified to accommodate different cell element thicknesses. One such approach is disclosed in U.S. Pat. Thune No. 4,041,603, issued Aug. 16, 1977 and assigned to the assignee of the present invention.

It has also been proposed to mold thin (ca. 0.6 mm) resilient ribs at angles to the container walls, which ribs deflect by an amount commensurate with the thickness of the cell element inserted in the cell compartment. One such approach is disclosed in U.S. Pat. Daniel et al No. 3,607,440, issued Sept. 21, 1971 and assigned to ESB Inc. Heretofore, molding such containers has left the base of the rib attached to the bottom of the container thereby necessitating a separate detaching operation. One such detaching operation is disclosed in copending United States patent application Ser. No. 153,334 filed on May 27, 1980 in the name of Richard H. Kline and assigned to the assignee of the present invention.

It is an object of the present invention to provide a commercially practical mold for injection molding a thermoplastic battery container having thin, inclined, resilient, retainer ribs projecting into the container's cell compartment(s), and which are detached or substantially detached from the bottom of the container in the as-molded condition thereby eliminating a subsequent detaching operation. This and other objects and advantages of the present invention will become more readily apparent from the detailed description thereof which follows.

BRIEF DESCRIPTION OF THE INVENTION

The present invention is an improvement to my copending United States patent application Ser. No. 172,513 filed July 28, 1980 now abandoned and assigned to the assignee of the present invention. That invention relates to a mold for injection molding thermoplastic battery containers having thin, inclined, resilient ribs molded on the compartment walls thereof to retain the battery's electrochemical innards. The mold has a core which includes: a mandrel for shaping the cell compartment, and means for stripping the container from the mandrel, wherein the stripping means includes a plurality of dovetail-shaped ejector bars reciprocally slideable within complementarily-shaped mortises in the mandrel. The rib-forming portions of the mold cavity are formed in the diverging walls of the ejector bars such that the ejector bar forms one side of the rib-forming cavity and the mortise wall forms the opposite side. The ejector bars push on the bottom of the container and the tops of the ribs while travelling with the container during the initial stage of stripping (i.e., at least until the ribs are nearly clear of the mortises in the mandrel). The present invention improves the previous invention embodied in U.S. Ser. No. 172,513 now abandoned by modifying each ejector bar to include a lip at its distal end and projecting toward the juxtaposed wall of its associated mortise. The lip extends to within about 0.1 mm of the juxtaposed wall. The gap so provided is too small for filling with thermoplastic during injection. The lip on the ejector results in the formation of a rib which is undercut at its base and detached from the bottom of the container as it comes out of the mold. Preferably, the lip is formed with a surface lying at a large angle (i.e., ca 150°) from the face of the ejector bar which defines one side of the rib-forming cavity. During the container stripping cycle, the angled surface of the lip acts much like a ramp to cam the unconfined flexible rib off the ejector bars without its catching or hanging up on the lip when the ejector bars begin to retract.

DETAILED DESCRIPTION OF A PREFERRED EMBODIMENT OF THE INVENTION

The invention may be better understood when considered in relation to the following description thereof which is made in conjunction with the several simplified drawings of a preferred mold and in which.

Figure 1:
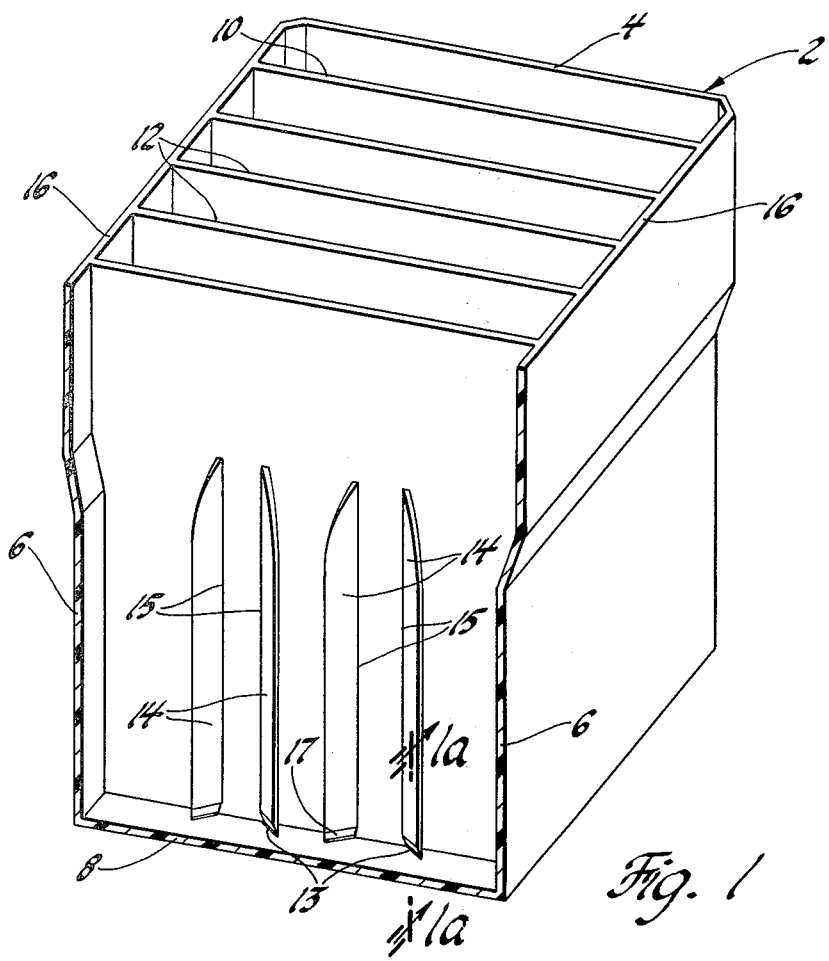
FIG. 1 illustrates a sectioned perspective view of a multicell battery container of the type molded in accordance with the present invention.
Figure 2:
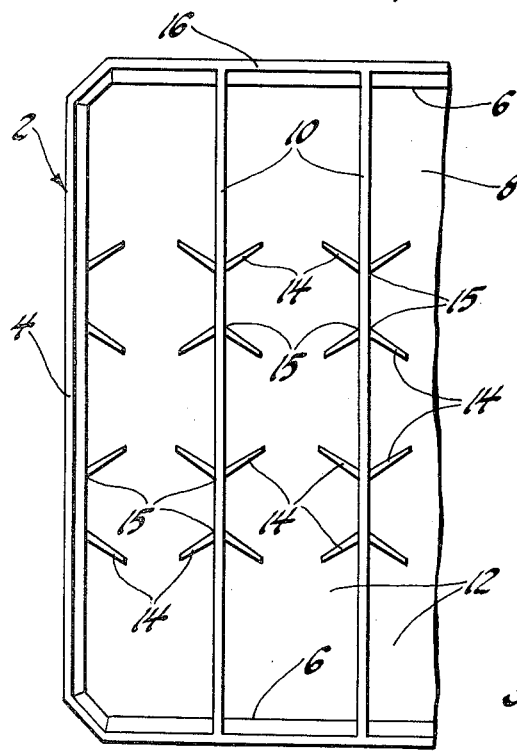
FIG. 2 illustrates a plan view of the battery container of FIG. 1.
Figure 1A:
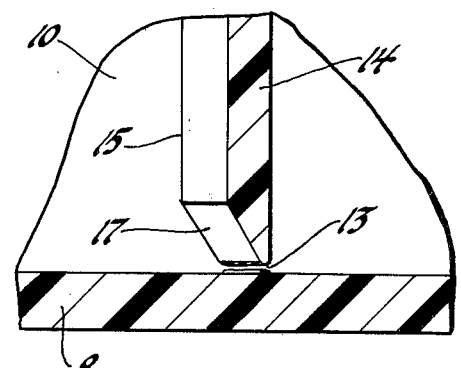
FIG. 1a is a magnified view of the base of one of the ribs shown in FIG. 1.

FIGS. 1 and 2 illustrate perspective and plan views respectively of thermoplastic multicell battery containers 2 injection molded from molds made in accordance with the present invention. The invention, however, is equally applicable to single cell containers as well. End walls 4, side walls 6 and bottom wall 8 define the container 2, while intercell partitions 10 divide the container 2 into a plurality of individual cell compartments 12. The battery's electrochemically active innards (i.e., plates, separators, connectors, etc.) are inserted into each of the compartments 12 through the open top (i.e., defined by the rim 16) of the container and appropriately electrically connected to achieve the desired battery voltage. Thin, flexible ribs 14 are integrally molded with the intercell partitions 10 and end walls 4 and are disposed at an angle (e.g., about 60°) thereto. The ribs 14 have their bases 13 at the bottom 8 and their roots 15 at the partitions 10 and walls 4. The ribs 14 have undercuts 17 at their base 13 to insure no significant attachment of the bars 13 to the bottom 8. The ribs 14 deflect commensurate with innards of varying thicknesses and serve to space the innards from the compartment walls and cushion them against damage due to vibration.

MOLD DESCRIPTION

Figure 3:
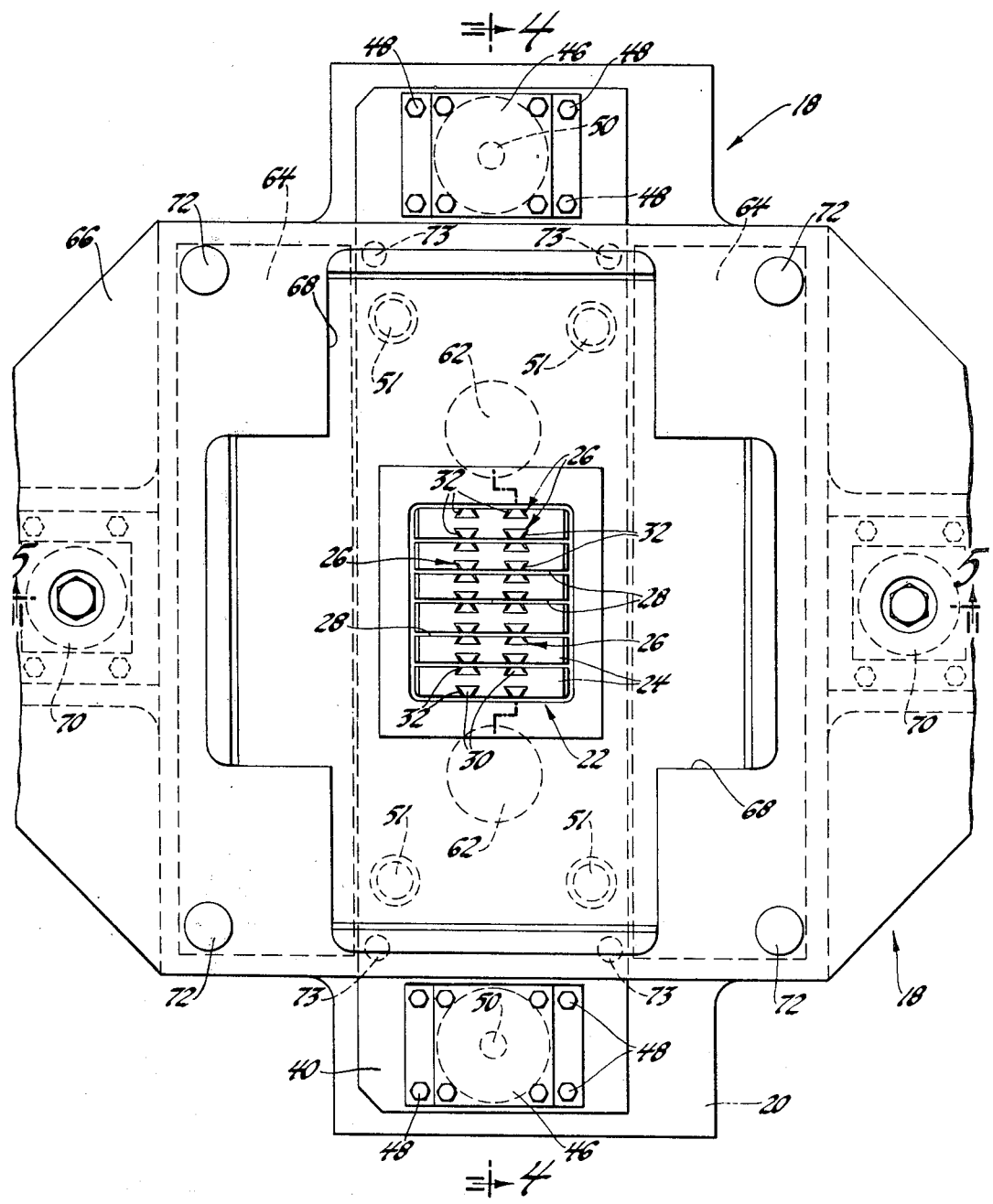
FIG. 3 illustrates a side elevational view of the core-bearing portion of a mold in the mold-open position (i.e., with the female portion of the mold displaced to the rear of the viewer)
Figure 4:
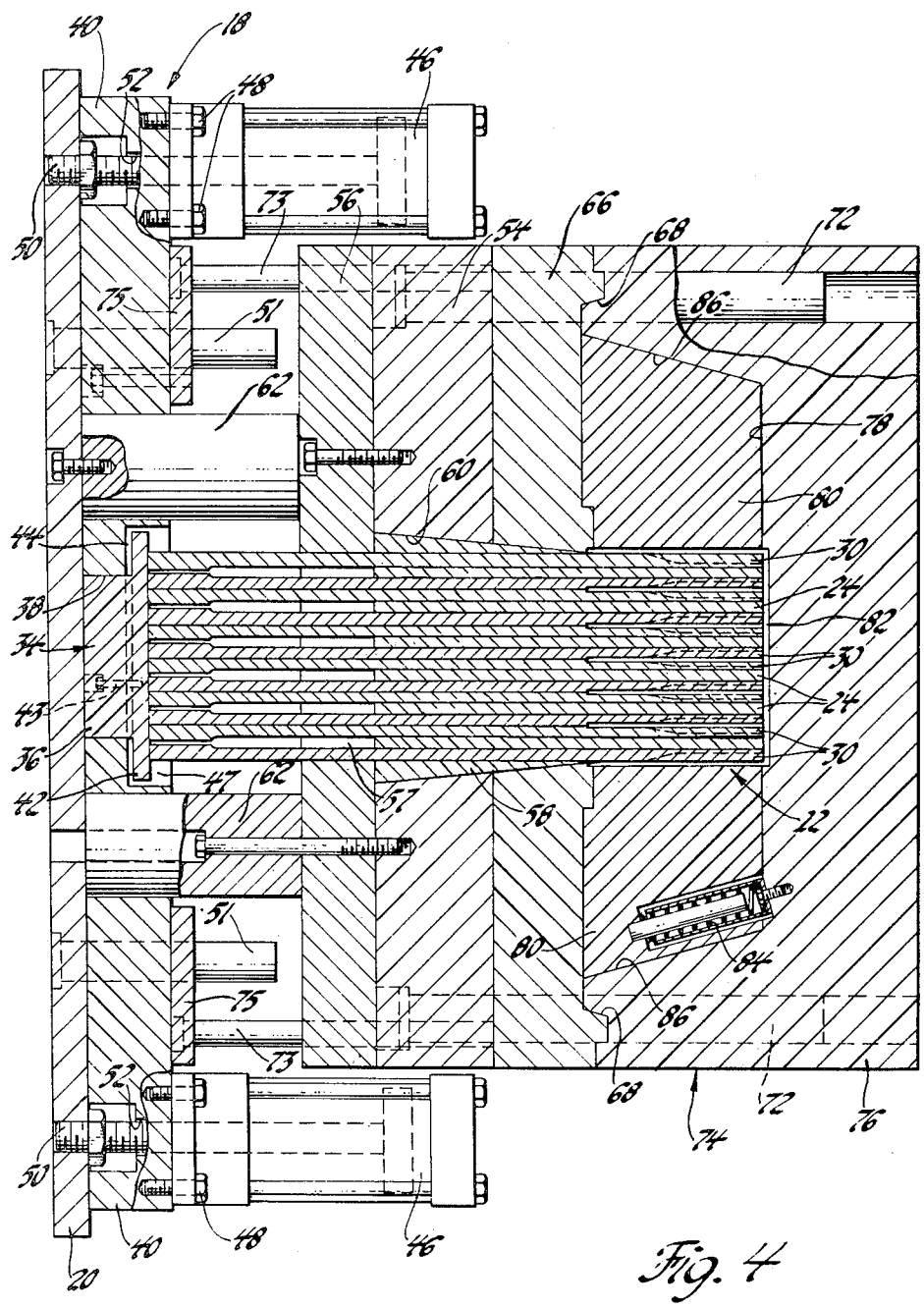
FIG. 4 is a sectioned front elevational view of the core-bearing portion of the mold taken in the direction 4—4 of FIG. 3, but in the mold-closed position (i.e., mated with the stationary/female portion of the mold)
Figure 5:
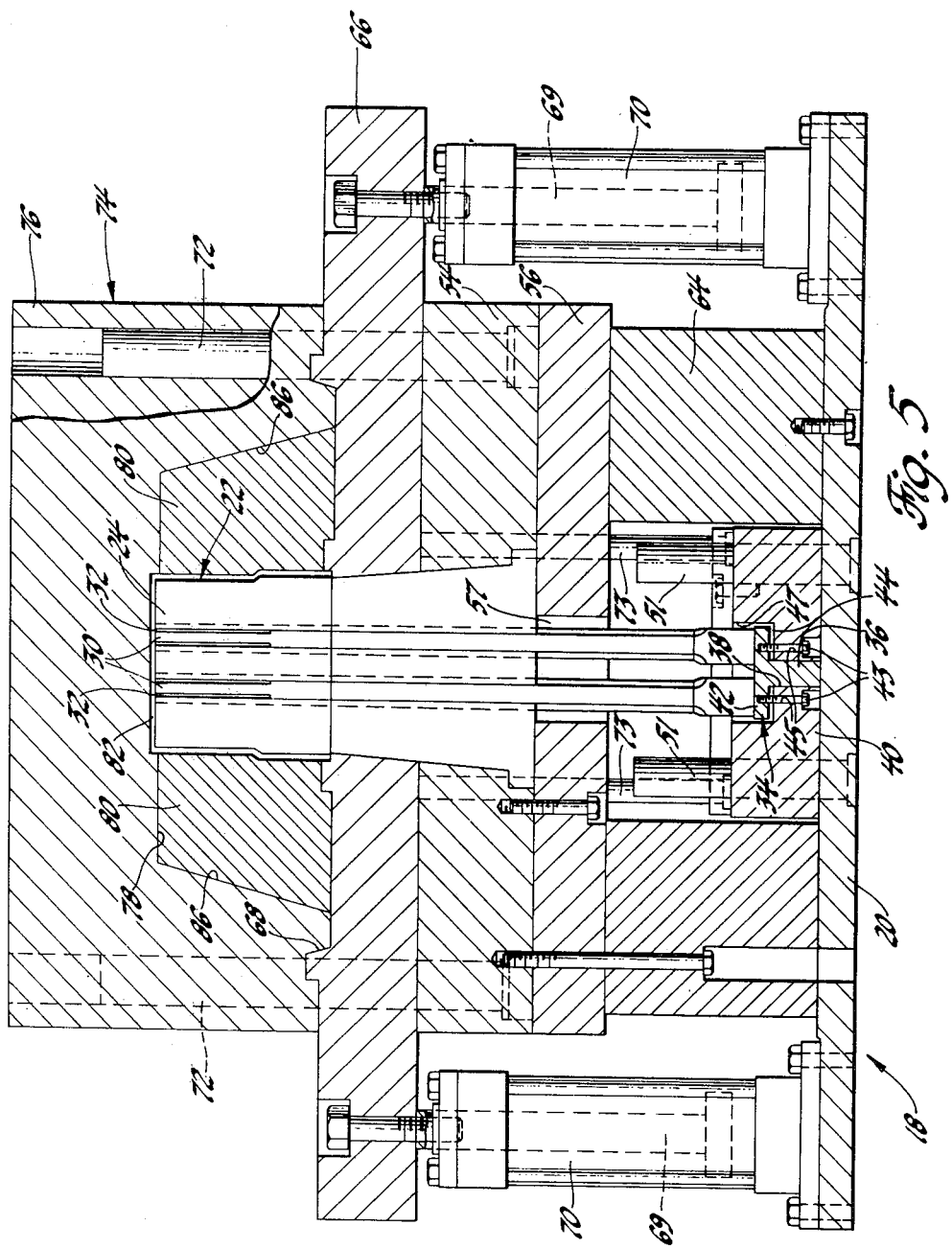
FIG. 5 is a sectioned bottom view of the core-bearing portion of the mold taken in the direction 5—5 of FIG. 3, but in the mold-closed position (i.e., mated with the stationary/female portion of the mold)

FIGS. 3–5 illustrate various views of the principal structural elements of a mold having the features of the present invention. FIG. 3 views the core-bearing portion 18 of the mold head-on in the mold-open position with the female or stationary portion of the mold to the rear of the viewer. In a press, the mold halves would move apart horizontally and separate along a vertical parting line. FIGS. 4 and 5, on the other hand, are views in the mold-closed position showing the core-bearing portion 18 with the stationary/female portion 74 of the mold in place and ready to receive the melt (e.g., polypropylene).

The core-bearing portion 18 of the mold includes a stationary backplate 20, a core 22 and means for stripping the container 2 from the core 22. The core 22 comprises a plurality of mandrels 24 sized to the compartments 12. The mandrels 24 include a plurality of dovetail-shaped (e.g., trapezoidal) mortises 26 formed in the molding surfaces 28 thereof. A plurality of complementarily-shaped ejector bars 30 fit within the mortises 26 and are adapted to reciprocate therein. The distal ends 31 of the ejector bars 30 push against the bottom wall 8 of the container 2 during stripping. Recesses 32 (see FIGS. 8 and 9) in the diverging walls of the ejector bars 30 near the distal ends 31 thereof define the rib-forming cavities. The opposite ends of the ejector bars 30 are joined to a pedestal 34 located in a groove 47 in an ejector actuating plate 40. The pedestal has a tenon portion 36 adapted to be slideably received in a mating opening 38 in the ejector actuating plate 40. A flange 42 on the pedestal 34 is spaced apart from the actuating plate 40 by a gap 44. Bolts 43 are slideably received in openings 45 in the ejector plate 40 and retain the pedestal 34 in the groove 47 in the plate 40, but are such as to permit relative movement between the pedestal 34 and plate 40 to accommodate shrinkage as will be discussed hereinafter.

The ejector actuator plate 40 is actuated by hydraulic cylinders 46 bolted to the plate 40 at 48. Cylinder rods 50 from the cylinders 46 slideably pass through openings 52 in the ejector plate 40 and adjustably attach to the stationary backplate 20 as illustrated (FIG. 4). Posts 51 are anchored to the plate 20 and serve to guide the ejector plate 40 during stripping.

The mandrels 24 are held tightly together, and to the core-bearing portion 18, by means of stationary mounting plates 54 and 56. In this regard, the roots or bases 58 of the mandrels 24 flare outwardly and are mated with a complementarily-shaped opening 60 in the forward mounting plate 54. The rearward mounting plate 56 is then bolted to forward plate 54 and the mandrels wedged tightly together. The stationary mounting plates 54 and 56 are rigidly affixed to the stationary backplate 20 and serve to space the plates 54–56 from the backplate 20. The ejector bars 30 extend from the pedestal 34 through an opening 57 in the rearward mounting plate 56 and thence through the mandrels 34.

A stripper plate 66 lies adjacent the forward mounting plate 54 and, in conjunction with the ejector bars 30, serves to strip the container 2 from the mandrels 24 following molding. The stripper plate 66 includes a cross-shaped recess 68 for mating with the stationary/female portion 74 of the mold as illustrated in FIGS. 4 and 5. The stripper plate 66 is bolted (see FIG. 5) to cylinder rods 68 of hydraulic cylinders 70 which are, in turn, bolted to the backplate 20. Four pilot posts 72 (see FIGS. 3, 6 and 7) are anchored to the forward stationary mounting plate 54 serve both to guide the stripper plate 66 and to register the core-bearing portion 18 of the mold with the stationary/female portion 74 during mold closing.

Four coordinating posts 73 are anchored to the ejector plate 40 by means of mounting plates 75. The coordinating posts 73 extend slideably through openings in the mounting plates 54–56 into contacting engagement with the backside of the stripper plate 66 and serve to maintain the spacing between the plates 40 and 66 during ejection.

The stationary/female portion of the mold 74 is shown in FIGS. 4 and 5 only, and comprises a main body 76 having a hollow 78 therein. In customary fashion, four cam doors 80 appropriately slide and fit within the hollow 78 to define a container-shaped mold cavity 82 therewith. Upon opening of the mold, a spring 84, acting in concert with appropriate linkage (not shown), causes the cam doors 80 to slide along the surfaces 86 and thereby move laterally away from the core 22 to release th outside of the container 2 from the mold. Upon closing, the cam doors 80 slide back into the position shown in FIGS. 4 and 5. Appropriate means (not shown) are provided to inject plastic into the cavity 82. Such stationary portions of the mold are well known in the art and require no further description.

Figure 8:
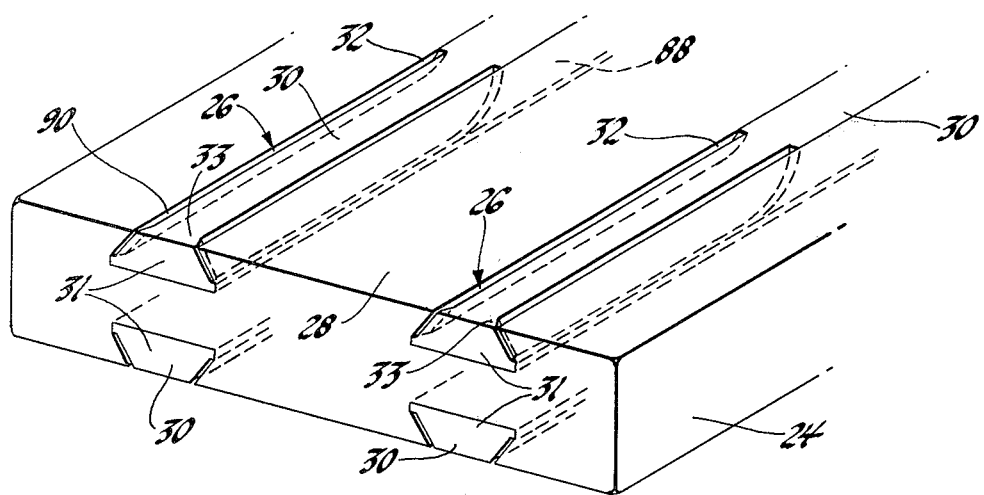
FIGS. 8 and 9 are enlarged perspective illustrations of a mandrel and associated ejector bars in the retracted and extended positions respectively.
Figure 9:
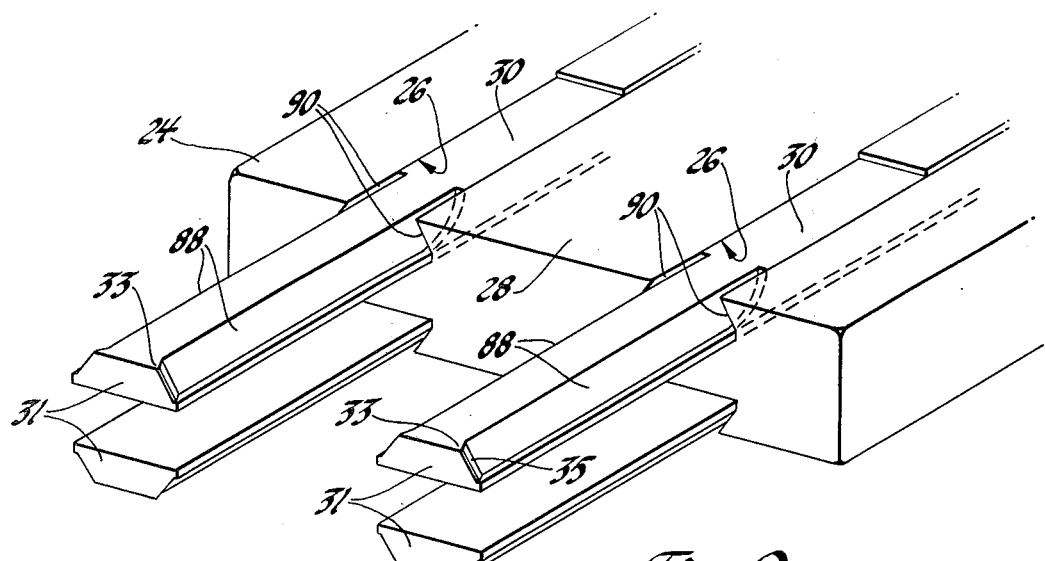
Figure 10:
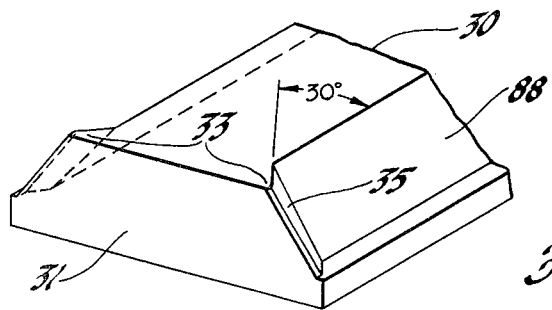
FIG. 10 is a magnified perspective illustration of the distal end of an ejector bar made in accordance with the present invention.

FIGS. 8, 9 and 10 are enlarged perspective illustrations of typical mandrels 24 and ejector bars 30 made in accordance with the present invention. FIG. 8 shows the ejector bars 30 in their retracted or molding position. In this position, the recess 32 which is machined into the diverging walls 88 of the ejector bars 30 forms a rib-forming cavity 32 with the corresponding diverging walls 90 of the complementarily-shaped mortises 26. The walls 90 diverge from the face 28 of the mandrel 24 at an angle that the ribs 14 bear to the partitions 10 in the finished container 2. The distal end 31 of the ejector bars 30 include a lip 33 which projects toward, and to within about 0.1 mm–0.2 mm of, the mortise walls 90. Normally, this tiny gap will not fill with plastic during injection, hence, leaving the rib completely detached from the bottom wall 8. Occasionally, a thin web of plastic will form in the gap, but it is not detrimental and is readily torn during stripping. It may even be desirable for some applications to provide a thin web of plastic at the base of the rib 14. A thin web is readily torn incident to insertion of the battery innards without a separate tearing operation. To provide a web, the the size of the lip 33 need only be reduced to provide a slightly larger gap. The lip 33 includes an angled (i.e., ca. 30° from ejector axis) surface 35 on the side of the lip 33 facing the rib-forming recess 32 to facilitate deflection of the ribs 14 around the lip 33 during ejection.

MOLD OPERATION

Figure 6:
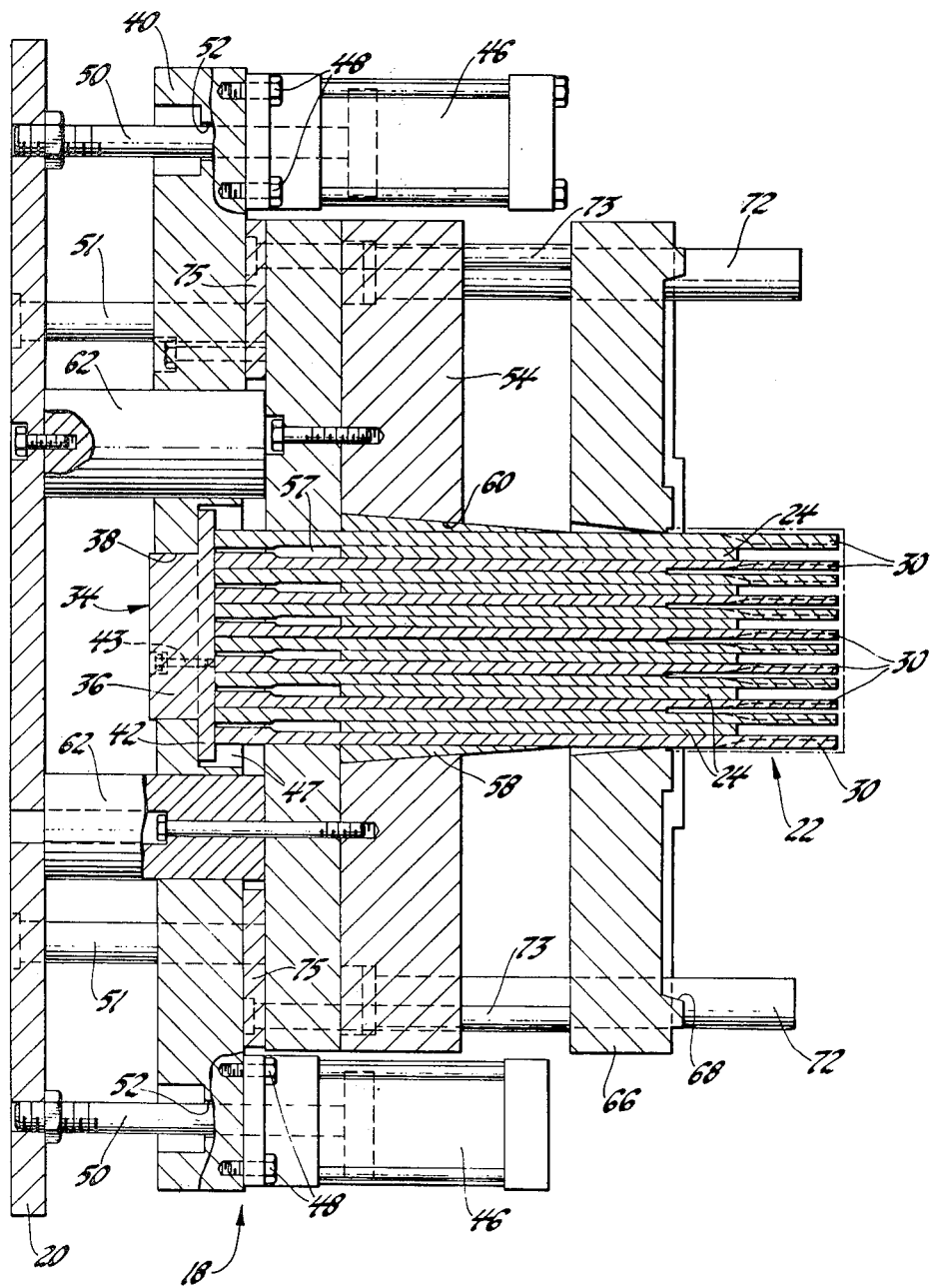
FIG. 6 is a sectioned front elevational view of the core-bearing portion of the mold shown in FIG. 4 (i.e., with the stationary/female portion of the mold displaced) late in the stripping cycle and showing the stripper plate in the fully forward position and the ejector bars in the retracted position.
Figure 7:
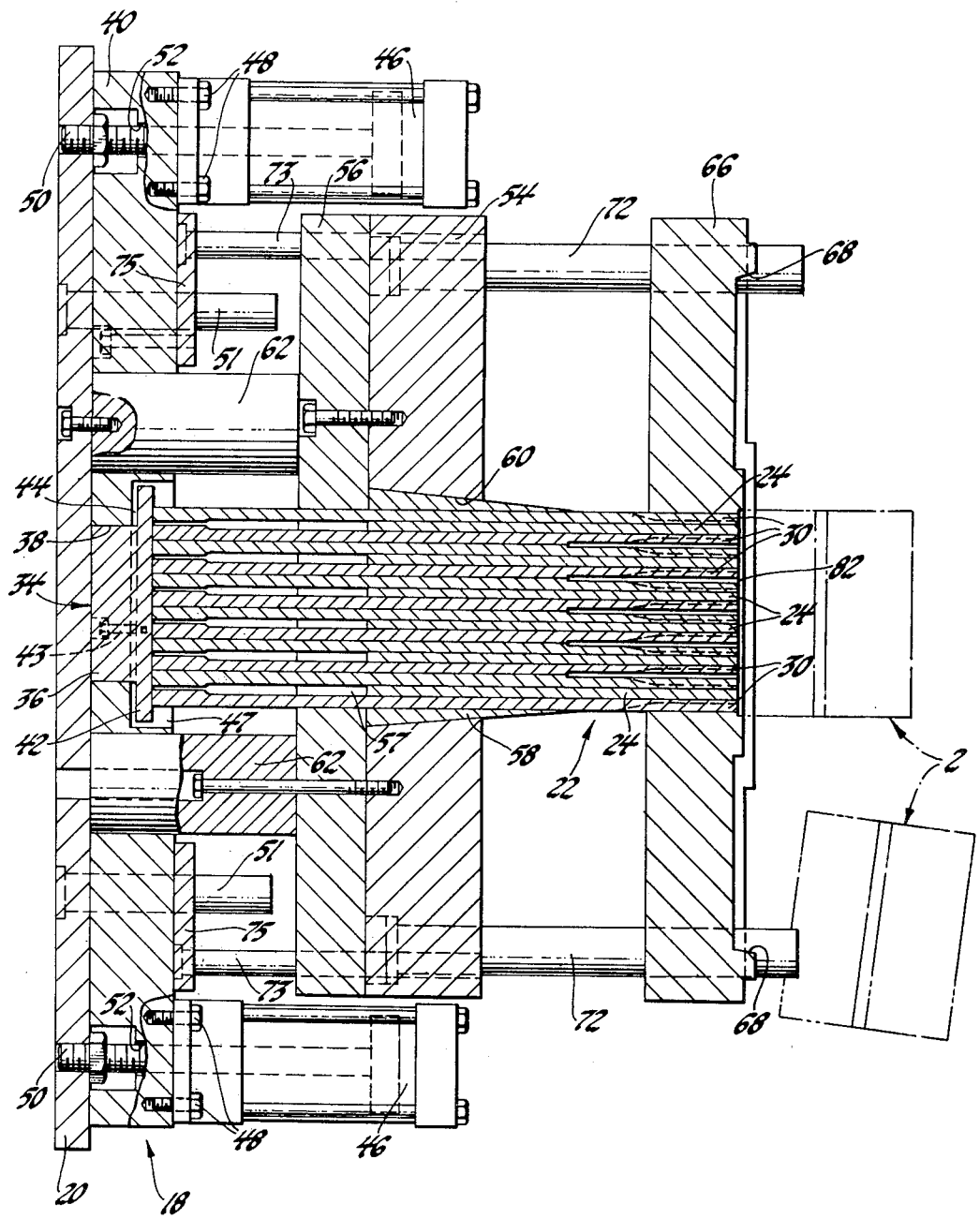

FIGS. 6 and 7 show the location of the principal structural elements of the core-bearing portion 18 of the mold at different stages in the container-stripping cycle. After the injected thermoplastic has solidified in the mold cavity 82, the core-bearing portion 18 of the mold separates from the stationary/female portion 74 and carries with it the container 2 shrunk tightly about the core 22. At this stage, the several moving parts of the core-bearing portion 18 of the mold are substantially in the position shown in FIG. 4. After the cores 22 have cleared the stationary/female portion 74 of the mold, hydraulic cylinders 70 are energized and the stripper plate 66 advances slightly (i.e., about 0.050"–0.125") to engage the rim 16 of the container 2 which has receded slightly from the face of the stripper plate 66 due to shrinkage. This moves the stripper plate 66 slightly away from the forward mounting plate 54 and the ends of the coordinating posts 73. Hydraulic cylinders 46 are then energized to advance the ejector actuating plate 40 until the coordinating posts 73 again engage the backside of the stripper plate 66. At this time, the bolts 43 slide in their openings and the gap 44 between the actuating plate 40 and the pedestal 34 is closed. The gap 44 is set to match the amount of shrinkage occurring at the rim 16, and hence, prevents the distal ends 31 of ejector bars 30 from puncturing holes in the bottom of the container 2 before the stripper plate 66 can start to push the container 2 off the core 22. After these initial short moves, the stripper plate 66, ejector plate 40, pedestal 34 and ejector bars 30 move forward in unison. At this time, the stripper plate 66 engages the rim 16 and the distal ends 31 of the ejector bars 30 engage the bottom wall 8 of the container 2 and together push the container 2 off the mandrels 24 as best shown in FIG. 6. The coordinating posts 73 hold the relative positions of the stripper and ejector plates 66 and 40 respectively and thereby prevent ejector plate 40 from overtaking stripper plate 66 and causing the distal ends 30 of ejector bars 30 to puncture the bottom of the container 2.

When the ejectors 30 have advanced to the point (i.e., about 3"–3½") where the ribs 14 are substantially clear of the mandrels 24, the action of cylinders 46 is reversed as well as the direction of the ejector plate 40. When the ejector plate 40 reverses, the bolts 43 slide in their openings 45 until their heads engage the backside of the ejector plate 40 and pull the pedestal 34 back and retract the ejector bars 30 into the mandrels 24 (see FIG. 7). At this time, the ribs 14 deflect sufficiently to permit the lip 33 to pass without catching on the rib. While the ejector bars 30 are retracting into the mandrels 24, the stripper plate 66 continues its forward movement to push the container free from the mandrels 24 (see FIG. 7). Thereafter, the stripper plate 66 reverses direction and returns to the position shown in FIG. 4, the mold closed and the molding cycle repeated.

While the invention has been disclosed primarily in terms of a single embodiment thereof, it is not intended to be restricted thereto, but rather only to the extent set forth in the claims which follow.

The embodiments of the invention in which an exclusive property or privilege is claimed are defined as follows:

1. A mold for injection molding a battery container having bottom, side and end walls defining a compartment for housing the electrochemical innards of said battery, said container having a plurality of thin, resilient ribs integral with, and projecting at acute angles from, said end walls into said compartment for holding said innards substantially centrally of said compartment, said ribs each having a base portion at said bottom wall, said mold including female and core-bearing portions coacting in a mold-closed position to define a mold cavity corresponding to said container, said core-bearing portion including a mandrel having an exterior surface for shaping the internal surface of said compartment and means for stripping said container from said mandrel, said stripping means including:
   dovetail-like mortises in said mandrel, each mortise being defined in part by opposing side walls diverging from said surface of said mandrel at substantially said acute angle;
   substantially complementary-shaped ejector bars reciprocally slidable within said mortises, said ejector bars each being defined in part by opposing faces juxtaposed said mortise side walls and being adapted for movement between an extended container-release position and a retracted container-molding position;
   a recess in each of said faces defining a rib-forming cavity between said ejector bar and an associated mortise side wall while said ejector bar is in said retracted position;
   means joined to a first end of each of said ejector bars for moving said ejector bars between said retracted and extended positions such that said ejector bars travel with said ribs to free said ribs from said rib-forming cavity at the time said container is stripped from said mandrel; and
   a lip on the distal end of each of said ejector bars opposite said first end, said lip projecting from a said face toward the associated juxtaposed mortise side wall to provide an undercut in said base portion of each of said ribs.

2. A mold for injection molding a battery container having bottom, side and end walls defining a compartment for housing the electrochemical innards of said battery, said container having a plurality of thin, resilient ribs integral with, and projecting at acute angles from, said end walls into said compartment for holding said innards substantially centrally of said compartment, said ribs each having a base portion at said bottom wall, said mold including female and core-bearing portions coacting in a mold-closed position to define a mold cavity corresponding to said container, said core-bearing portion including a mandrel having an exterior surface for shaping the internal surface of said compartment and means for stripping said container from said mandrel, said stripping means including:
  dovetail-like mortises in said mandrel, each mortise being defined in part by opposing side walls diverging from said surface of said mandrel at substantially said acute angle;
  substantially complementary-shaped ejector bars reciprocally slidable within said mortises, said ejector bars each being defined in part by opposing faces juxtaposed said mortise side walls and being adapted for movement between an extended container-release position and a retracted container-molding position;
  a recess in each of said faces defining a rib-forming cavity between said ejector bar and an associated mortise side wall while said ejector bar is in said retracted position;
  means joined to a first end of each of said ejector bars for moving said ejector bars between said retracted and extended positions such that said ejector bars travel with said ribs to free said ribs from said rib-forming cavity at the time said container is stripped from said mandrel; and
  a lip on the distal end of each of said ejector bars opposite said first end, said lip projecting from a said face toward, and to within about 0.2 mm or less of, the associated juxtaposed mortise side wall such that each of said ribs is molded substantially detached from said bottom wall.

3. A mold for injection molding a battery container having bottom, side and end walls defining a compartment for housing the electrochemical innards of said battery, said container having a plurality of thin, resilient ribs integral with, and projecting at acute angles from, said end walls into said compartment for holding said innards substantially centrally of said compartment, said ribs each having a base portion at said bottom wall, said mold including female and core-bearing portions coacting in a mold-closed position to define a mold cavity corresponding to said container, said core-bearing portion including a mandrel having an exterior surface for shaping the internal surface of said compartment and means for stripping said container from said mandrel, said stripping means including:
  dovetail-like mortises in said mandrel, each mortise being defined in part by opposing side walls diverging from said surface of said mandrel at substantially said acute angle;
  substantially complementary-shaped ejector bars reciprocally slidable within said mortises, said ejector bars each being defined in part by opposing faces juxtaposed said mortise side walls and being adapted for movement between an extended container-release position and a retracted container-molding position;
  a recess in each of said faces defining a rib-forming cavity between said ejector bar and an associated mortise side wall while said ejector bar is in said retracted position;
  means joined to a first end of each of said ejector bars for moving said ejector bars between said retracted and extended positions such that said ejector bars travel with said ribs to free said ribs from said rib-forming cavity at the time said container is stripped from said mandrel;
  a lip on the distal end of each of said ejector bars opposite said first end, said lip projecting from a said face sufficiently toward the associated juxtaposed mortise side wall as to mold each of said ribs substantially detached from said bottom wall; and
  an inclined ramp-like surface on each of said lips facing said recess and serving to facilitate deflection of said ribs out of interference with said lips when said container is stripped from said mandrel.

4. A mold for injection molding a battery container having bottom, side and end walls and at least one partition parallel to said end walls and dividing said container into at least two compartments for housing the electrochemical innards of said battery, said container having a plurality of thin, resilient ribs integral with, and projecting at acute angles from, said partition and end walls into said compartments for holding said innards substantially centrally of said compartments, said ribs each having a base portion at said bottom wall, said mold including female and core-bearing portions coacting in a mold-closed position to define a mold cavity corresponding to said container, said core-bearing portion including a plurality of mandrels each having an exterior surface for shaping the internal surface of an associated compartment and means for stripping said container from said mandrels, said stripping means including:
  a plurality of mortises in said mandrels, each mortise being defined in part by at least one wall angling inward from said mandrel surface at substantially said acute angle;
  substantially complementary-shaped ejector bars reciprocally slidable within said mortises, said ejector bars each being defined in part by at least one face juxtaposed said mortise side wall and being adapted for movement between an extended container-release position and a retracted container-molding position;
  a recess in said face of each of said bars defining a rib-forming cavity between said ejector bar and an associated mortise wall while said ejector bar is in said retracted position;
  means joined to a first end of each of said ejector bars for moving said ejector bars between said retracted and extended positions such that said ejector bars travel with said ribs to free said ribs from said rib-forming cavity at the time said container is stripped from said mandrel; and
  a lip on the distal end of each of said ejector bars opposite said first end, said lip projecting from said face toward the associated juxtaposed mortise side wall to provide an undercut in said base portion of each of said ribs.

5. A mold for injection molding a battery container having bottom, side and end walls defining a compartment for housing the electrochemical innards of said battery, said container having a plurality of thin, resilient ribs integral with, and projecting at acute angles from, said end walls into said compartment for holding said innards substantially centrally of said compartment, said ribs each having a base portion at said bottom wall, said mold including female and core-bearing portions coacting in a mold-closed position to define a mold cavity corresponding to said container, said core-bearing portion including a mandrel having an exterior surface for shaping the internal surface of said compartment and means for stripping said container from said mandrel, said stripping means including:

a plurality of mortises in said mandrel, each mortise being defined in part by at least one wall angling inward from said surface of said mandrel at substantially said acute angle;

substantially complementary-shaped ejector bars reciprocally slidable within said mortises, said ejector bars each being defined in part by at least one face juxtaposed said mortise side wall and being adapted for movement between an extended container-release position and a retracted container-molding position;

a recess in said face of each of said bars defining a rib-forming cavity between said ejector bar and an associated mortise side wall while said ejector bar is in said retracted position;

means joined to a first end of each of said ejector bars for moving said ejector bars between said retracted and extended positions such that said ejector bars travel with said ribs to free said ribs from said rib-forming cavity at the time said container is stripped from said mandrel; and a lip on the distal end of each of said ejector bars opposite said first end, said lip projecting from a said face toward the associated juxtaposed mortise side wall to provide an undercut in said base portion of each of said ribs.

* * * * *